Patented Apr. 26, 1932

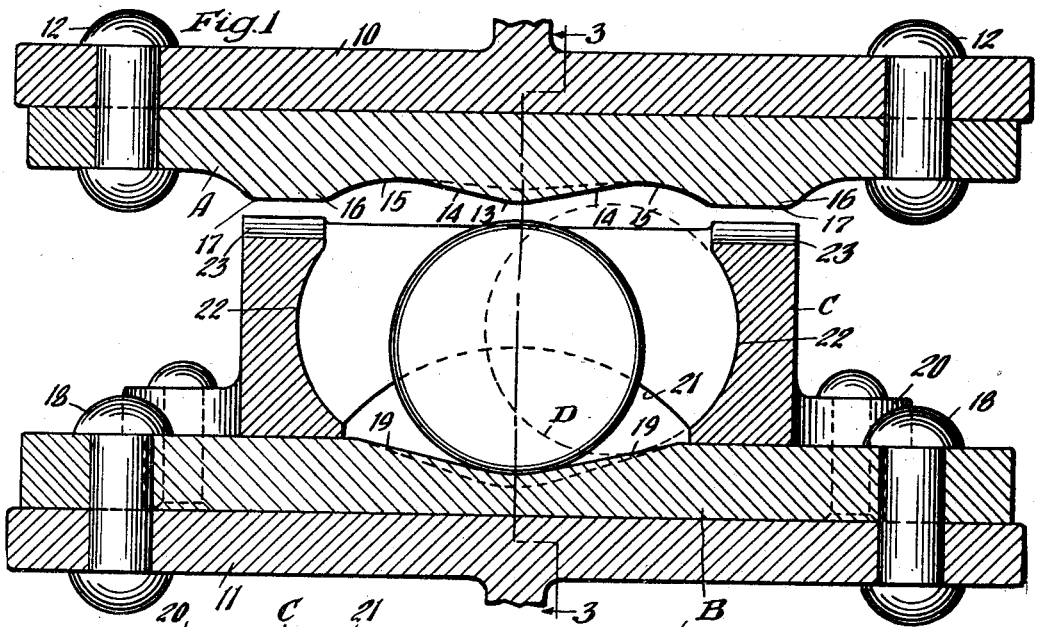
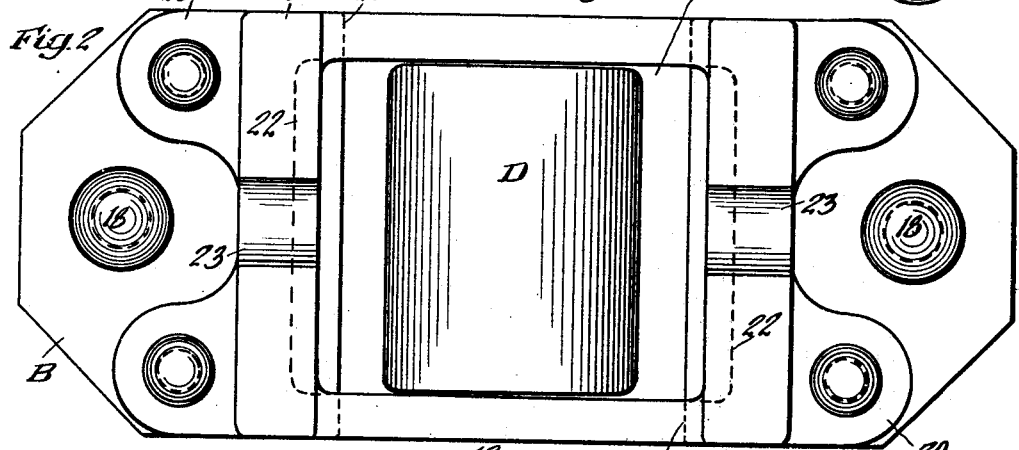
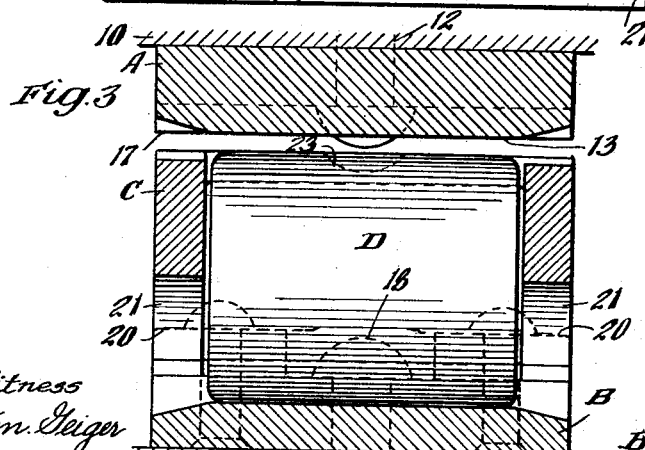

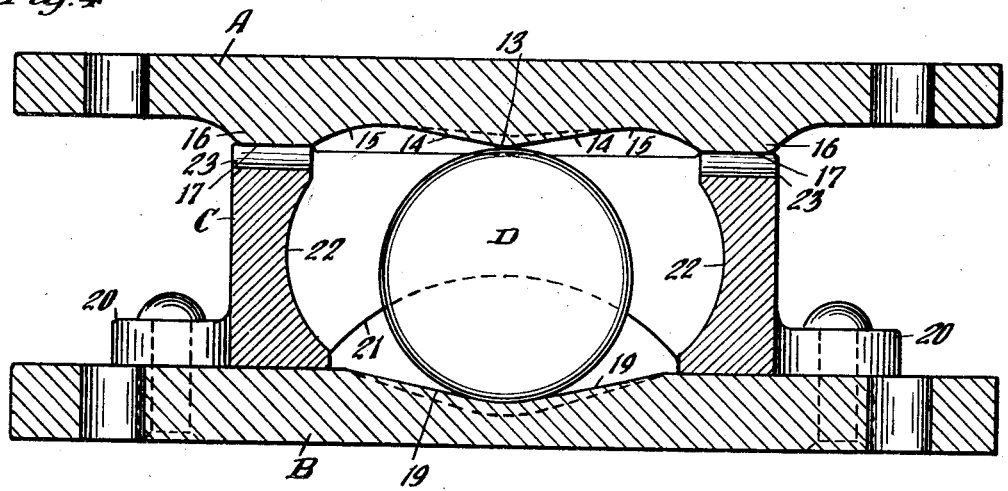
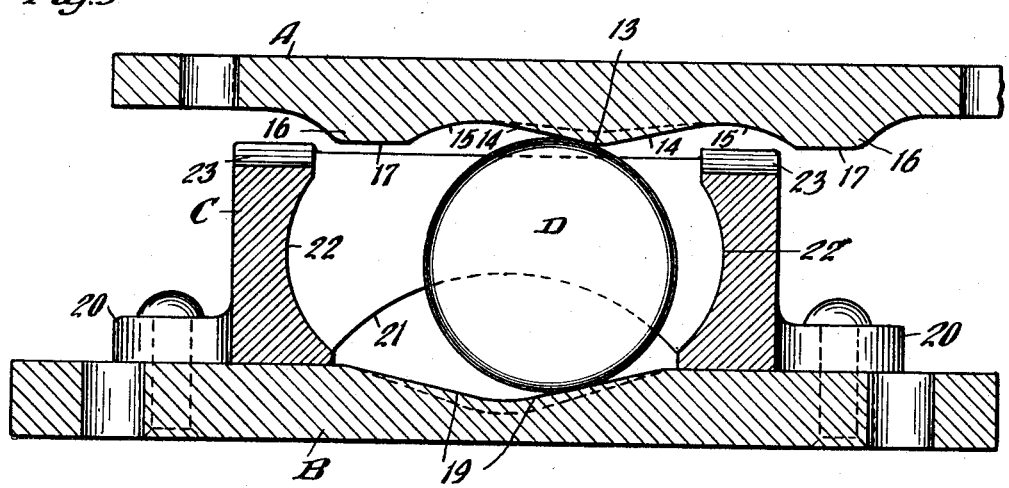

1,855,725

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

ANTIFRICTION BEARING

Application filed November 26, 1928. Serial No. 321,856.

This invention relates to improvements in anti-friction bearings.

One object of the invention is to provide a simple and efficient anti-friction side bearing for railway cars, including an anti-friction element interposed between cooperating opposed bearing surfaces provided on the body and truck bolsters, respectively, wherein pounding of the parts when the bolsters are in vertical alinement while the car is operated on straight tract is distributed over a relatively large abutment surface area, including abutment faces on fixed abutment members on the respective bolsters and also surface portions of the anti-friction element and cooperating bearing surface portions on the bolsters.

Another object of the invention is to provide an anti-friction bearing for railway cars, including a roller interposed between the opposed bearing surfaces on the body and truck bolsters, wherein pounding when the bolsters are in vertical alinement is distributed between the roller and the bearing surfaces of the bolsters engaged thereby, and between engaging abutments on the bolsters, thus dividing the load between these elements and preventing flattening of the roller and other injury to the same, and wherein the load is taken by the roller only upon displacement of the same from centered position during the operative movements of the bearing.

A further object of the invention is to provide an anti-friction side bearing of the roller type, which is self-centering, the bearing surface of the body bolster of the car being inclined upwardly in opposite directions from the center to effect the return of the roller to centered position through the action of gravity, the bearing surfaces of the body bolster which cooperate with the roller being inclined to compensate for the inclination of the truck bolster bearing surfaces to maintain the bolsters separated to approximately the same extent throughout the operation of the bearing, wherein the bearing surfaces of the bolster engage the roller when the bolsters are in vertical alinement and the pounding action on the roller is relieved by cooperating abutment means on the bolsters which is effective at the same time that the roller is engaged.

A more specific object of the invention is to provide an anti-friction bearing of the character indicated, including a roller interposed between opposed bearing surfaces on the body and truck bolsters of a car, a housing secured to one of the bolsters in which the roller is mounted, the housing having abutment means at opposite ends thereof adapted to be engaged by abutment members on the other bolster when the bolsters are in vertical alinement and moved toward each other, the central portions of the bearing surfaces of the bolsters being spaced such a distance apart that they will engage the roller simultaneously with contact between the abutment members and abutment means to sustain the pounding action on the bearing.

Other and further objects of the invention will more clearly appear from the description and claims hereinafter following.

In the drawings, forming part of this specification, Figure 1 is a vertical, sectional view through portions of the body and truck bolsters of a railway car, illustrating my improvements in connection therewith. Figure 2 is a top plan view of the parts of the improved anti-friction bearing which are mounted on the truck bolster. Figure 3 is a transverse vertical, sectional view, corresponding substantially to the line 3—3 of Figure 1. Figure 4 is a view similar to Figure 1, with certain parts omitted, illustrating the bolsters displaced toward each other. And Figure 5 is a view similar to Figure 1, showing the bearing surfaces on the bolsters in engagement with the anti-friction element of my improved device, the bolsters of the car being displaced angularly with reference to each other.

In said drawings, 10 designates the bottom portion of the body bolster and 11 the top portion of the truck bolster of a railway car. In Figure 1, the bolsters are shown in vertically alined position, while in Figure 5 they are shown as displaced angularly with reference to each other.

In carrying out my invention, I provide a bearing plate A secured to the body bolster and a cooperating bearing plate B secured to the truck bolster; a housing C fixed to the bearing plate B, and an anti-friction roller D disposed in the housing and interposed between the bearing surfaces of the plates A and B.

The plate A, which is secured to the body bolster, is of substantially rectangular outline, having the corners thereof cut away. The plate is secured to the bottom side of the bolster 10 by any suitable means, such as rivets 12—12. The plate A is provided with a bottom bearing surface 13 which cooperates with the anti-friction roller D when the bolsters approach each other. As shown, the bearing surface 13 is inclined upwardly in opposite directions from the center, as indicated by 14—14. Beyond the inclined portions 14—14, the opposite ends of the bearing surface of the plate A are curved, as indicated at 15—15. The plate A is also provided with depending portions 16—16 which present flat bottom abutment surfaces 17—17 which cooperate with abutment means carried by the truck bolster, as hereinafter more specifically pointed out, to limit relative approach of the bolsters when the same are in vertical alinement.

The bearing plate B is also of substantially rectangular outline and has the corners thereof cut away, as clearly shown in Figure 2. The plate B is secured to the top face of the truck bolster 11 by any suitable means, such as rivets 18—18. The bearing plate B is provided with a top bearing surface which is upwardly inclined in opposite directions from the center, as indicated at 19—19.

The housing C is in the form of a rectangular box-like member, open at the top and bottom and having securing lugs 20—20 at the opposite ends thereof, which are riveted to the plate B, as shown in Figures 1 and 2. The side walls of the housing are provided with bottom openings 21—21 to permit the escape of cinders and other foreign material which would interfere with the proper functioning of the roller bearing member. The end walls of the housing are interiorly cut away to provide concave seats 22—22 which cooperate with the roller to limit the extreme movements thereof in both directions lengthwise of the housing. The top portions of the end walls are recessed centrally, as indicated at 23—23, to accommodate the projecting portions of the rivets 12 when the bolsters are displaced angularly with reference to each other. As most clearly shown in Figure 1, the end walls of the housing are raised slightly with respect to the side walls, thereby providing abutment members which cooperate with the abutment faces 17 on the truck bolster bearing plate A to limit relative approach of the bolsters and take the pounding action when the bolsters are in vertical alinement and the car is being operated on substantially straight track.

The anti-friction element D is in the form of a roller and is disposed within the housing and normally rests on the bearing surface of the plate B. The roller is of such a diameter that it will contact with the central portion of the bearing plate A when the bolsters approach each other in their vertically alined position. In other words, the clearance between the roller and the central portion of the bearing surface of the plate A and the clearance between the abutment portions of the end walls of the housing C and the abutment surfaces 17 of the plate A is such that simultaneous contact of these parts will be effected when the bolsters approach each other.

The opposed bearing surfaces of the bearing plates of the body and truck bolsters, as shown in Figure 1, converge slightly outwardly toward the opposite ends of the plates, so that when the roller is rolled from its centered position a very slight elevation of the body bolster will be effected with respect to the truck bolster, thereby assuring engagement of the bearing surfaces of the plates A and B with the roller at all times to effect rolling action of the latter.

In the operation of my improved side bearing, assuming that the parts are in the centered position shown in Figure 1, and that the body and truck bolsters are moved toward each other, the relative approach of the bolsters will be limited by engagement of the bearing faces 17 with the bearing faces of the end walls of the housing C and by engagement of the central portion of the bearing surface of the plate A with the top of the anti-friction roller D. This position of the parts is clearly shown in Figure 4. Upon relative angular displacement of the bolsters to either side of their vertically alined position, the abutment surfaces 17 will slide laterally on the top surfaces of the end walls of the housing. Inasmuch as the bearing surface of the plate A is in engagement with the top portion of the roller D at this time, the roller will also be compelled to move laterally, thereby providing an anti-friction rolling action between the parts. Inasmuch as the opposed bearing surfaces of the plates A and B converge outwardly, as hereinbefore pointed out, these surfaces will approach each other as the bolsters are displaced angularly, thereby placing the principal load on the anti-friction roller.

As soon as the abutment surfaces 17 of the bearing plate A are brought out of alinement with the abutment surfaces at the top of the end walls of the housing, through the angular displacement of one bolster with reference to the other, the entire weight of the body bolster will be supported by the anti-friction roller D and, during the remainder of the relative angular movement of the bolsters, until the extreme position of the roller indicated in dotted lines in Figure 1 is assumed, the roller will sustain the weight of the body bolster and a rolling anti-friction action will be had. As soon as the bolsters are separated, the anti-friction roller element D will return to its centered position, shown in Figure 1, through the action of gravity, the roller rolling down one of the inclined surface portions 19 of the plate B.

As will be evident when the parts are in the position shown in Figure 1 and the bolsters are moved toward each other and the abutment means on the body bolster bearing plate is brought into engagement with the abutment means on the housing, the roller will also have contact with the bearing plate A, but the pounding action on the bearing will be sustained mainly by the cooperating abutment means, thereby relieving the roller from undue strain and preventing flattening of the curved surface thereof. Although the roller is relieved from the greater portion of the load, the same serves to assist in sustaining the pounding action and the strain is therefore distributed between three widely spaced points, that is, the roller and the end walls of the housing.

By providing contact between the central portion of the bearing surface of the plate A and the roller, when the bolsters are moved toward each other when in vertical alined position, rolling movement of the anti-friction element is assured immediately upon relative angular displacement of the bolsters.

While I have herein shown and described what I consider the preferred manner of carrying out my invention, the same is merely illustrative, and I contemplate all changes and modifications which come within the scope of the claims appended hereto.

I claim:

1. In an anti-friction bearing for railway cars, the combination with body and truck bolsters having opposed bearing surfaces; of an anti-friction element having rolling contact with one of said bearing surfaces and being engaged by the other bearing surface upon relative approach of the bolsters to take the load and limit the approach of the bolsters; and cooperating abutment means on said bolsters additionally supporting one bolster on the other when the bolsters are in vertical alinement when the relative approach thereof is limited by said element, the engaging portions of said abutment surfaces being restricted in area to effect disengagement thereof by relative lateral displacement upon relative angular displacement of said bolsters from said vertically aligned position, thereby placing the load entirely on said anti-friction element.

2. In an anti-friction bearing for railway cars provided with body and truck bolster having opposed bearing surfaces, the combination with an anti-friction roller element interposed between said bearing surfaces and sustaining the load when said bolsters are displaced toward each other and during relative angular movement thereof while so displaced the bearing surface of each bolster being inclined upwardly in opposite directions from the center thereof; of cooperating abutments on said bolsters sustaining the load jointly with said element when the bolsters are displaced toward each other while in vertically alined relation, said abutments being brought out of supporting relation with respect to each other when one bolster is angularly displaced with reference to the other a predetermined distance, thereby placing the entire load on the anti-friction element.

3. In an anti-friction bearing for railway cars provided with body and truck bolster, the combination with a bearing plate secured to each bolster, said plates presenting opposed bearing surfaces, each of said bearing plates having protruding abutment means thereon at opposite ends of the bearing surfaces thereof, said protruding abutment means of the bearing plates being in vertical alignment when the bolsters are centered and engageable with each other to limit relative approach of the bolsters, said abutment means being moved out of vertical alignment and disengaged from each other when the bolsters are swung angularly from said vertically aligned position; of an anti-friction roller element interposed between the bearing surfaces of the bolsters and engaging said surfaces in all relative angular positions of said bolsters when the latter are displaced toward each other to sustain the load jointly with said abutment means while the bolsters are in said vertically aligned position, said anti-friction element sustaining the entire load when said bolsters are angularly displaced with respect to each to render said abutment means inoperative.

4. In an anti-friction bearing for railway cars provided with opposed body and truck bolsters, the combination with means on said bolsters providing opposed bearing surfaces; of an anti-friction element interposed between said bearing surfaces and supported by the truck bolster bearing surface, said truck bolster bearing surface being inclined upwardly in opposite directions from the center thereof, the bearing surface of the body bolster being also upwardly inclined in opposite directions from the center thereof; a housing for said anti-friction element, said housing being supported on one of the bolsters, said housing having projecting abutments at opposite ends thereof; spaced abutments on the other bolster, co-operating with said abutments of the housing, said abutments of the housing and opposed bolster being in alinement when the bolsters are in vertical alinement and being brought out of alinement when the bolsters are displaced angularly with respect to each other, said abutments and anti-friction element limiting relative approach of the bolsters when centered in vertical alinement, and said anti-friction element sustaining the entire load when the bolsters are displaced angularly with respect to each other to an extent to disengage said abutments.

In witness that I claim the foregoing I have hereunto subscribed my name this 23rd day of November 1928.

JOHN F. O'CONNOR.